US012034262B2

(12) United States Patent
Mogadam

(10) Patent No.: US 12,034,262 B2
(45) Date of Patent: Jul. 9, 2024

(54) DEVICE AND METHOD FOR CONNECTING A CABLE TO AN ELECTRICAL CONNECTOR

(71) Applicant: TELSONIC HOLDING AG, Bronschhofen (CH)

(72) Inventor: Saeed Mogadam, Newton, MA (US)

(73) Assignee: Telsonic Holding AG, Bronschhofen (CH)

( * ) Notice: Subject to any disclaimer, the term of this patent is extended or adjusted under 35 U.S.C. 154(b) by 749 days.

(21) Appl. No.: 16/507,275

(22) Filed: Jul. 10, 2019

(65) Prior Publication Data

US 2020/0076146 A1 Mar. 5, 2020

Related U.S. Application Data

(60) Provisional application No. 62/724,745, filed on Aug. 30, 2018.

(51) Int. Cl.
*H01R 43/02* (2006.01)

(52) U.S. Cl.
CPC ..... *H01R 43/0207* (2013.01); *H01R 43/0263* (2013.01)

(58) Field of Classification Search
CPC ........................ H01R 43/0207; H01R 43/0263
USPC ................................ 29/860, 857, 825, 592.1
See application file for complete search history.

(56) References Cited

U.S. PATENT DOCUMENTS

| | | | | |
|---|---|---|---|---|
| 4,718,160 A | 1/1988 | Bulanda et al. | | |
| 6,367,148 B1 * | 4/2002 | Caveney | H01R 43/055 29/748 | |
| 7,134,190 B2 | 11/2006 | Bungo et al. | | |
| 2003/0100228 A1 * | 5/2003 | Bungo | B23K 20/10 439/701 | |
| 2010/0288819 A1 * | 11/2010 | Huenig | H01R 43/0207 228/110.1 | |
| 2011/0099801 A1 * | 5/2011 | Particka | H01R 43/048 29/753 | |

* cited by examiner

*Primary Examiner* — Livius R. Cazan
(74) *Attorney, Agent, or Firm* — Finch & Maloney PLLC

(57) ABSTRACT

It is suggested to provide a device (1) for connecting a cable to an electrical connector (15). The device (1) comprises a welding nest (16) and a connector advancing mechanism for feeding the electrical connector (15) to the welding nest (16). Preferably the welding nest is an ultrasonic welding nest. The connector advancing mechanism comprises a separation unit (2), a feeding mechanism (3) and a transfer mechanism (4). The separation unit (2) is a separation unit for separating at least one connector (15) from a strip (21) to which the connector (15) is attached. The at least one connector (15) is preferably separated from the strip (21) with a cutting die (17). The feeding mechanism (3) is a feeding mechanism for feeding the connector (15) to the separation unit (2). The transfer mechanism (4) is a transfer mechanism for transferring the connector (15) from the separation unit (2) to the welding nest (16). Along a direction of transport (T) of a connector (15) the feeding mechanism (3) is disposed before the separation unit (2) and the separation unit (2) is disposed before the transfer mechanism (4). The transfer mechanism (4) includes a pusher with one or two or more feed fingers (5) for pushing a first connector (15) in the direction of transport (T).

23 Claims, 13 Drawing Sheets

DEVICE AND METHOD FOR CONNECTING A CABLE TO AN ELECTRICAL CONNECTOR

This application claims the benefit of U.S. provisional application Ser. No. 62/724,745 filed Aug. 30, 2018.

FIELD OF THE INVENTION

The present invention relates to a device and a method for connecting a cable to an electrical connector.

BACKGROUND OF THE INVENTION

A cable and an electric connector are usually brought to a welding station manually or semi-automatically with e.g. robotic arms. The advent and increasing use of ultrasonic welding has led to an increased variety of electrical connectors which are welded to cables. At the same time the increased use of ultrasonic welding has led to a higher demand in terms of speed and cost for ultrasonically welding the cable and the electric connector. This relates not only to the ultrasonic welding machines themselves, but also to the feeding mechanisms for feeding in electrical connectors.

US 2010/0288819 A1 discloses a method for connecting a cable to an electrical connection element. US 2010/0288819 A1 discloses a feeding unit which feeds a connection element tape to a cutting unit. In the cutting unit, consecutive connection elements are cut off from the connection element tape. Then the cut off connection elements are each gripped by a gripping unit of first transport means and placed in an ultrasonic welding nest.

U.S. Pat. No. 7,134,190 B2 discloses an automated wire harness machine. A conveyor transports pallets and wafers through a series of stations, which perform automated manufacturing steps. The conveyor includes a third station, or ultrasonic welder, which galls an un-stripped non-ferrous core of a crimped wire to a terminal.

U.S. Pat. No. 6,367,148 B1 relates to a crimping machine. The crimping machine includes a feed finger which is pivotally mounted by a pivot shaft to a machine body. A pin mounted to the slide shaft pivotally carries a first end of a feed link to advance and retract a feed finger in accordance with a reciprocation of the slide shaft. Motion control elements are disposed at a distal end of the feed finger. A feed projection of the feed finger pushes a terminal strip.

U.S. Pat. No. 4,718,160 discloses a terminal feed mechanism. The terminal feed mechanism advances the terminal strip sequentially and reciprocally along a path until the terminal feed mechanism engages a shoulder of an interchangeable die set that precisely aligns a lead terminal carried by the terminal feed mechanism with the die sets of the applicator. The terminal strip applicator carries a terminal strip with a finger along a track.

SUMMARY OF THE INVENTION

The problem to be solved by the present invention is to provide a device and a method for connecting a cable to an electrical connector by welding with a feeding mechanism, which is versatile and adapted to feed a variety of forms of electric connectors. Advantageously, the device and method are fully automatable and allow a fast and uninterrupted feeding of the connectors to a welding station.

According to the invention, the problem is solved with a device and a method for connecting a cable to an electric connector according to the independent claims and their characterizing features.

It is suggested to provide a device for connecting a cable to an electrical connector. The device comprises a welding nest and a connector advancing mechanism for feeding the electrical connector to the welding nest. Preferably, the welding nest is an ultrasonic welding nest. The connector advancing mechanism comprises a separation unit, a feeding mechanism and a transfer mechanism. The separation unit is a separation unit for separating at least one connector from a strip, to which the connector is attached. The feeding mechanism is a feeding mechanism for feeding the connector to the separation unit. The transfer mechanism is a transfer mechanism for transferring the connector from the separation unit to the welding nest. Along a direction of transport of a connector, the feeding mechanism is disposed before the separation unit and the separation unit is disposed before the transfer mechanism. The transfer mechanism includes at least one transfer guiding surface and a pusher with one or two or more feed fingers for pushing a singularized connector in the direction of transport along the at least one transfer guiding surface.

The separation unit preferably comprises a cutting die. The one or two or more feed finger preferably includes a tip for pushing the first connector in the direction of transport. Particularly preferred, the tip includes a flat surface for pushing the first connector. Additionally the separation unit may comprise a chute for dispensing excess carrier strip after cutting of the connector.

In the sense of the present invention, “cable” is used as a general term. In particular, a cable may be a strand, a flat conductor, a ribbon cable, an enameled wire, a wire, a braided strand or similar.

Preferably the device is suitable for a strip, to which connectors are attached.

The term “guiding surfaces” is understood as surfaces which support the connector and may help orient and direct the connector while the connector is being moved. The guiding surfaces may form a U-shape or an L-shape.

In a preferred embodiment, the transfer mechanism comprises at least one guiding surface for guiding a connector along the direction of transport. Thereby, the motion of an electrical connector is better controlled and the electrical connector is less likely to be lost.

The guiding surface preferably is U-shaped or L-shaped or may form a canal. The canal preferably includes a substantially flat bottom surface and, particularly preferably, side walls orthogonally to the substantially flat bottom surface.

The device allows a fast and flexible feeding of electrical connectors to a welding nest. Devices as described in the prior art are only adapted to be used with a single type of connector. The above described device has the advantage of being adapted for a plurality of connector types without any further amendments to the device. Thereby, a “universal feeder” is supplied.

The electrical connectors are detached from the strip before they are transferred by the transfer mechanism and can thus be inserted into the welding nest without the strip, which significantly facilitates handling of the connectors. Furthermore, the detached connectors may be swiveled relative to the cable. In addition, the proposed device may allow a simpler construction because the different functions (i.e. cutting transportation and welding) are separated from each other.

Pushing is particularly advantageous because the connectors are not lost. A further advantage of pushing might be that space close to an ultrasonic welding machine is saved, since the ultrasonic welding machine does not need to be modified. Modifying the welding machine is costly.

In one embodiment the at least one finger is a ratchet finger.

In a preferred embodiment the one or two or more feed fingers are adapted to hold the connector securely. The connector may be held securely by clamping or by enclosing the connector. Alternatively, the connector may be held loosely, for example by being pushed at the tip of the fingers.

In a preferred embodiment, the transfer mechanism comprises a gripper. Two or more feed fingers may be fixedly attached to jaws of the gripper. Thereby, a secure attachment is ensured.

In a preferred embodiment, the connector gripper is adapted to hold a connector in the separation unit. Thereby, the gripper may be used for two purposes at the same time, i.e. holding the connector securely in the separation unit and transporting the connector after the separation to the welding nest. Thereby, a connector spends little time in the cutting unit.

Preferably, the pusher includes two or more feed fingers. Thereby, an orientation of a connector relative to the pusher may be controlled.

In a one embodiment, the one or two or more feed finger additionally include a recess for receiving and pushing a second connector in the direction of transport. Thereby, the pusher may push two connectors at the same time in the direction of transport. As a result, the throughput of the connectors is increased.

In a one embodiment, the transfer mechanism comprises two or more feed fingers which are fixedly connected to each other. Thereby, an orientation of the electrical connector may be controlled more easily.

In a one embodiment, the transfer mechanism additionally comprises a bar with a pushing surface for pushing a third connector in the direction of transport. Thereby, the transfer mechanism may push another connector in the direction of transport and increase the throughput of connectors even further.

In a preferred embodiment, the transfer mechanism is adapted to move the terminal in one motion from the separation unit to the welding nest. Thereby, a reliability of a position can be increased.

In a one embodiment the transfer mechanism comprises a hold-down spring adapted to provide a downforce to one or more connectors. Thereby, the connectors are pushed against the feeding fingers and are not lost during the transfer after they are detached. The spring may extend over the entire transfer mechanism. The spring may be a leaf spring.

The bar is preferably fixedly attached or attachable to the pusher.

In a preferred embodiment, the transfer mechanism comprises at least one track for guiding one or two or more of the feed fingers. Thereby, operation of the feed fingers is facilitated. Preferably, the transfer mechanism comprises one track for all feed fingers.

In a preferred embodiment, the feeding mechanism comprises a feeding clamp. The feeding clamp may be adapted to clamp the strip and/or one or more connectors at the same time. Further, the feeding mechanism may include an actuator for moving the feeding clamp along the direction of transport. The feeding mechanism may comprise a surface, on which the connectors can be moved.

The transfer mechanism may comprise transfer guiding surface for guiding the connectors along the direction of transport. Thereby, the connectors may not be lost to a side.

The transfer guiding surface may comprise side walls adapted to guide the connectors. The side walls may be parallel.

In one embodiment, the feeding mechanism includes one or two or more rollers for transporting the electrical connector. Particularly preferably, one or two or more of the rollers are nip rollers. The rollers may be fabricated from a compliant material, e.g. hard rubber. Thereby, the strip with the connectors may be advanced by pushing the connectors. Alternatively, one or more of the rollers may be made of a non-compliant material like metal or plastic.

In one embodiment, a distance between two or more rollers is adjustable. Thereby, the rollers are adaptable to receive a variety of connectors, in particular a variety of connectors having different sizes.

In one embodiment, the feeding mechanism includes a first roller and a second roller with parallel longitudinal axes. In between the first roller and the second roller, an opening for holding a connector is formed. Thereby, a connector may be gripped and held between the rollers.

In one embodiment, the one or two or more rollers are a body of rotation with a lateral surface and a circumferential recession on the lateral surface. Thereby, the opening is formed. In particular, the recession is formed on a first and/or a second roller. Particularly preferably, the first roller is positioned vertically above the second roller during intended use. In one embodiment, the second feed roller and the first feed roller include a section for advancing a strip to which the at least one connector is attached. In another embodiment of the invention, the second feed roller is separated into two parts, which are preferably mounted on a common axle.

In a preferred embodiment the feeding mechanism includes at least one finger for pushing the connectors when they are attached to a strip. The finger may be a ratchet finger. Preferably, the finger is spring loaded such that the finger is positionable in a space between two connectors connected to a strip. The finger may have an up position and a down position, wherein in the up position the finger is movable relatively to the strip with the connectors, such that the ratchet finger is movable from one space between two connectors to another space between two connectors.

In the down position the finger may be positioned such that least one connector is pushable by the finger. In the down position the finger may be positioned between two connectors. Particularly preferably, the finger is spring loaded to the down position. In the down position the finger may be in contact with a connector and/or the strip.

The finger may be mounted slidably in the direction of transport. Further preferably the finger is attached to a linear bearing. The linear bearing may be driven by a motor, preferably an electric servo motor. Alternatively, the bearing may be driven by stepper motor or an air cylinder. The finger may have a notch for receiving a connector at least partly.

Thereby, a large variety of connectors, which are attached to a strip, may be transported independent of their size. A further advantage is that the feeding mechanism capitalizes on the space between connectors for pushing the connectors and thus is universal for feeding parts, which are attached to a strip.

In certain embodiments the feeding mechanism may comprise two or three or more fingers. Thereby, the connectors may be held more securely and more force may be transmitted without damaging the directly pushed connector.

In certain embodiments the feeding mechanism may comprise two or more linear bearings.

In a preferred embodiment, the separation unit includes a down holder spring for holding down the connector and/or the strip to which the connector is attached. The down holder spring may be a leaf spring. Thereby, the connector is fixed in one place while separating the connector from the strip and a connection between strip and connector may be cut without losing the connector.

Additionally or alternatively, the separation unit may comprise one or two or more holding fingers. The holding fingers may be ratchet fingers. The holding fingers may be attached to a slide, which is located at the cutter. The slide may be advanced by a motor. The motor may be a servo or stepper motor or an air cylinder. The holding fingers are adapted to hold down a connector such that it may be separated from the strip.

In a preferred embodiment, the down holder spring extends along the direction of transport at least through a part of the transfer mechanism, particularly preferably through the entire transfer mechanism. Thereby, a motion of the connector is better controlled in the transfer mechanism.

In a preferred embodiment, the separation unit includes a position sensor for detecting the presence of a connector in the separation unit. Particularly preferred, the position sensor is a photoelectric sensor. The photoelectric sensor may be a through beam sensor. Thereby, a connector is detected when it is located in the separation unit and a separation operation may be started.

In a preferred embodiment, the transfer mechanism includes a rotation motor which drives a cam and a cam follower lever biased against an outer surface of the cam.

In a preferred embodiment, the transfer mechanism includes a tie rod which is pivotally attached to the pusher on a first end and pivotally attached to an actuation lever on a second end of the tie rod. In a preferred embodiment, the actuation lever is fixedly connected to the cam follower lever. Thereby, a reciprocating motion of the pusher may be generated.

In a preferred embodiment, the welding nest includes a rotation mechanism for rotating the nest around a pivot axis for orienting the connector in relation to the cable. Thereby, the connector can be automatically turned without manual intervention. A welding angle between cable and connector is thus determined. The position of the inserted connector may be programmed.

The welding nest may comprise a spring clamp for holding a connector down. Thereby, a connector may be securely held in a fixed position for welding. Additionally or alternatively the welding nest may comprise an active clamp mechanism, which is adapted to clamp the connector down, once it is received by the welding nest. The welding nest may comprise a position sensor, such as a through beam, to detect the presence of a connector in the welding nest.

It is further suggested to provide a method for connecting a cable to an electrical connector. The method comprises the steps of:

a. Feeding at least one connector, which is attached to a strip, into a separation unit with a feeding mechanism,
b. Separating a connector from the strip with a separation unit, preferably with a cutting die,
c. Transferring a first connector from the separation unit to a welding nest with a pusher including one or two or more feed fingers, preferably by pushing with the finger tips,
d. Inserting a cable into the welding nest and bringing it into contact with the connector,
e. Welding, preferably ultrasonic welding of the separated connector to the cable in the welding nest.

In a preferred embodiment, the feed finger additionally includes a recess and the method further contains the steps of:

(c.1.1) Receiving a second connector in a recess of the feed finger,
(c.1.2) Pushing a second connector with a surface of the recess along a direction of transport,
(c.1.3) Disengaging the recess by the finger,
(c.1.4) Retracting the feed finger along the direction of transport,
(c.1.5) Receiving a following connector in the recess.

In a preferred embodiment, the method further contains the steps of:

(c.2.1) Engaging a third connector with a bar which is attached to the pusher,
(c.2.2) Pushing the third connector with the bar along a direction of transport,
(c.2.3) Disengaging the bar from the third connector,
(c.2.4) Retracting the bar along the direction of transport,
(c.2.5) Engaging a following connector with the bar.

In a preferred embodiment, step (c.1.2) and/or step (c.2.2) are conducted simultaneously with step (c).

In a preferred embodiment, step (b) further includes a step of clamping the connector against a counter surface with a spring while separating the first connector from the strip.

In a preferred embodiment, step (d) further includes rotating the welding nest with the connector in relation to the cable. Thereby, the cable may be welded to the connector at a predetermined adjustable angle between the longitudinal axes of the cable and the connector.

BRIEF DESCRIPTION OF THE DRAWINGS

The following non-limiting embodiments of the invention are described, by way of example only, with respect to the enclosed drawings, in which.

DETAILED DESCRIPTION OF THE PREFERRED EMBODIMENTS

Figure 2:
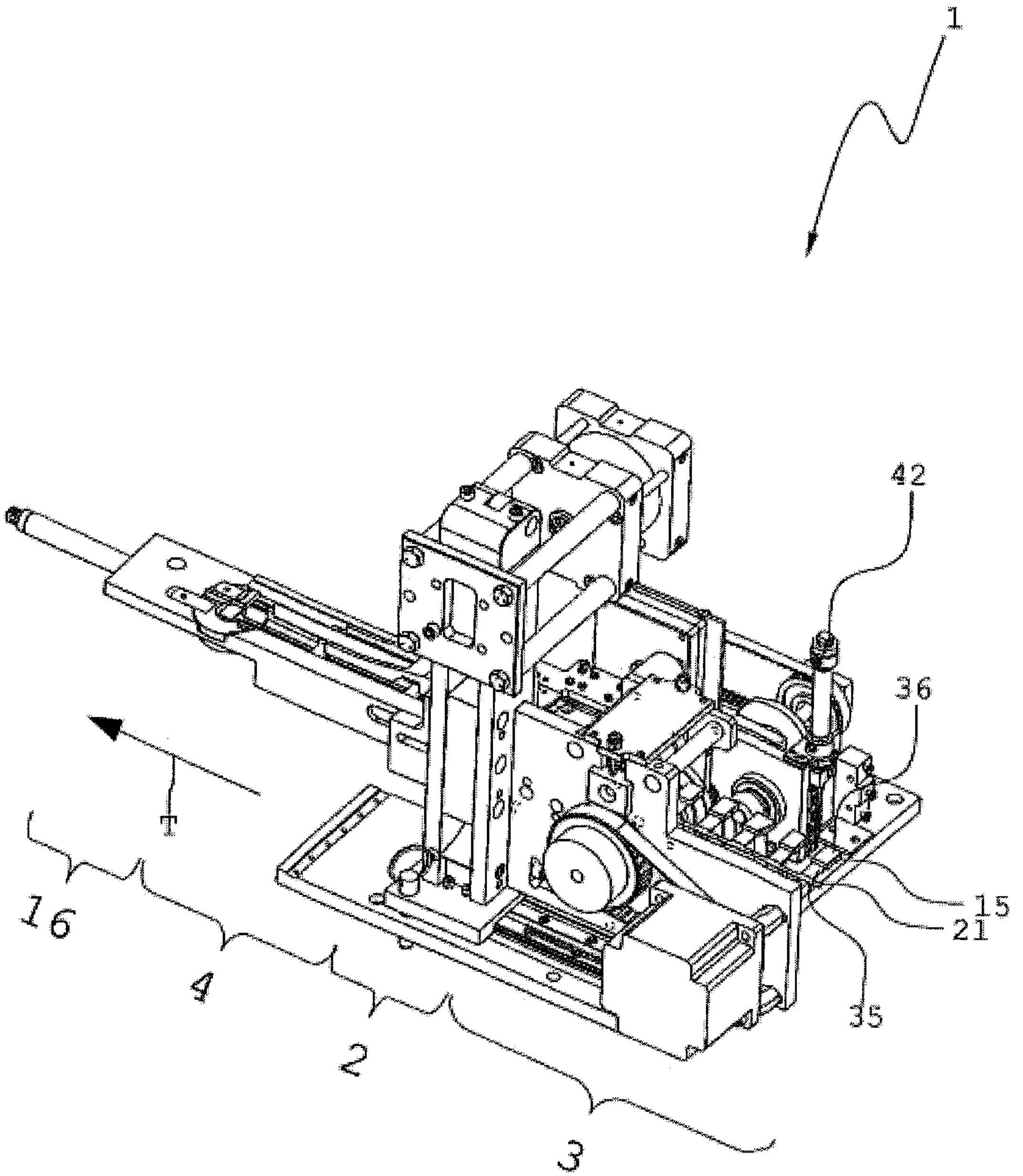
FIG. 2 shows a perspective view from a first side of a device for connecting a cable.

FIG. 2 shows a perspective view of a first side of a device 1 for connecting an electrical connector to a cable. The device 1 comprises a feeding mechanism 3, a separation unit 2, a transfer mechanism 4 and a welding nest 16. Multiple electrical connectors 15 are connected to a strip 21. The strip 21 with the electrical connectors 15 is fed into the device 1. The electrical connectors 15 shown in FIG. 2 are plug connectors 15 with a plug 36 and a welding surface 35. The connectors 15 are moved along a direction of transport T by the device 1. The electrical connectors 15 are first received by the feeding mechanism 3 and then transferred to the separation unit 2. In the separation unit 2, the electrical connectors 15 are separated from strip 21. Then, the electrical connectors 15 are transported in singulated form by the transporting mechanism 4 to the welding nest 16. In the welding nest 16, a cable (not shown) is inserted and welded to the electrical connector 15.

Figure 3:
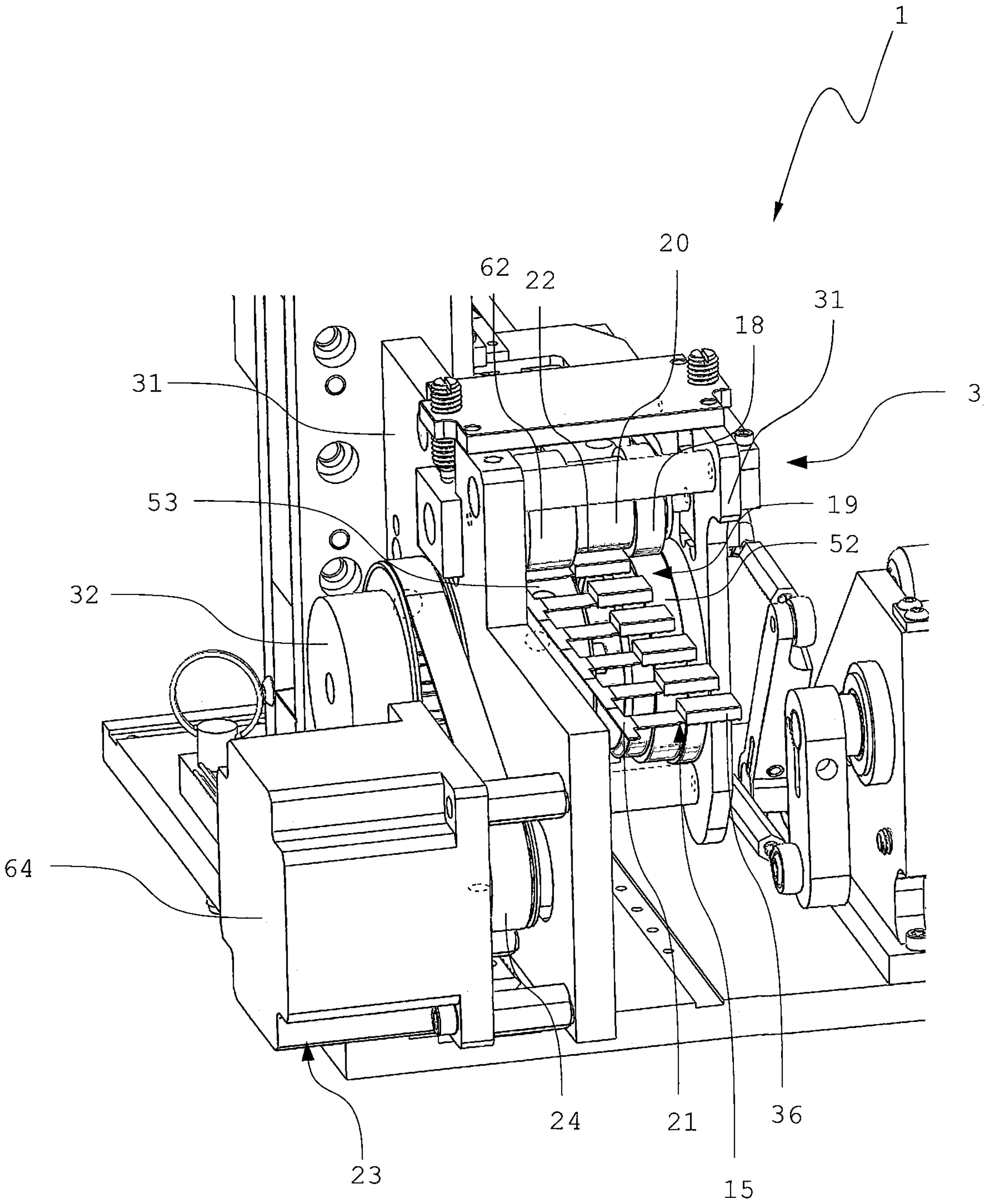
FIG. 3 shows a detailed perspective view of a feeding mechanism.

FIG. 3 shows a detailed perspective drawing of the feeding mechanism 3. The feeding mechanism 3 includes a drive unit 23. The drive unit 23 includes an electric motor 64, which generates a rotating motion with a drive shaft (not shown). This rotating motion is transferred via a belt 24 to a shaft 32. The belt 24 includes cams on an inner side. Thereby, the rotating motion is passed from the electric motor 64 to the shaft 32. The feeding mechanism 3 includes a housing 31. The shaft 32 extends through the housing 31 and is held in the housing 31 on opposite ends of the shaft 32 by pivot bearings. Within the housing 31, a second nip roller 19 is mounted on the shaft 32. The second nip roller 19 is separated into two parts 52 and 53. Vertically above the second nip roller 19, a first nip roller 18 is mounted. The first part 52 of the second nip roller 19 is used to transmit the rotation of the shaft 32 and the second nip roller 19 to the first nip roller 18. The second part 53 of the second nip roller 19 grips the strip 21 as well as the welding surface 35 of the electrical connector. Thereby, the strip 21 and the welding surface 35 are gripped and the strip 21 and the electrical connectors 15 are fed into the device 1.

In addition, the first nip roller 18 includes a lateral surface 62 with a circumferential recession 20. The circumferential recession 20 forms an opening 22, in which the plug 36 of connector 15 is receivable. The plug 36 is clamped between the second part 52 of the second nip roller 19 and the recession 20. The nip rollers 18, 19 are made of hard rubber and are thus compliant. Thus, the plug 36 is tightly gripped.

Figure 4:
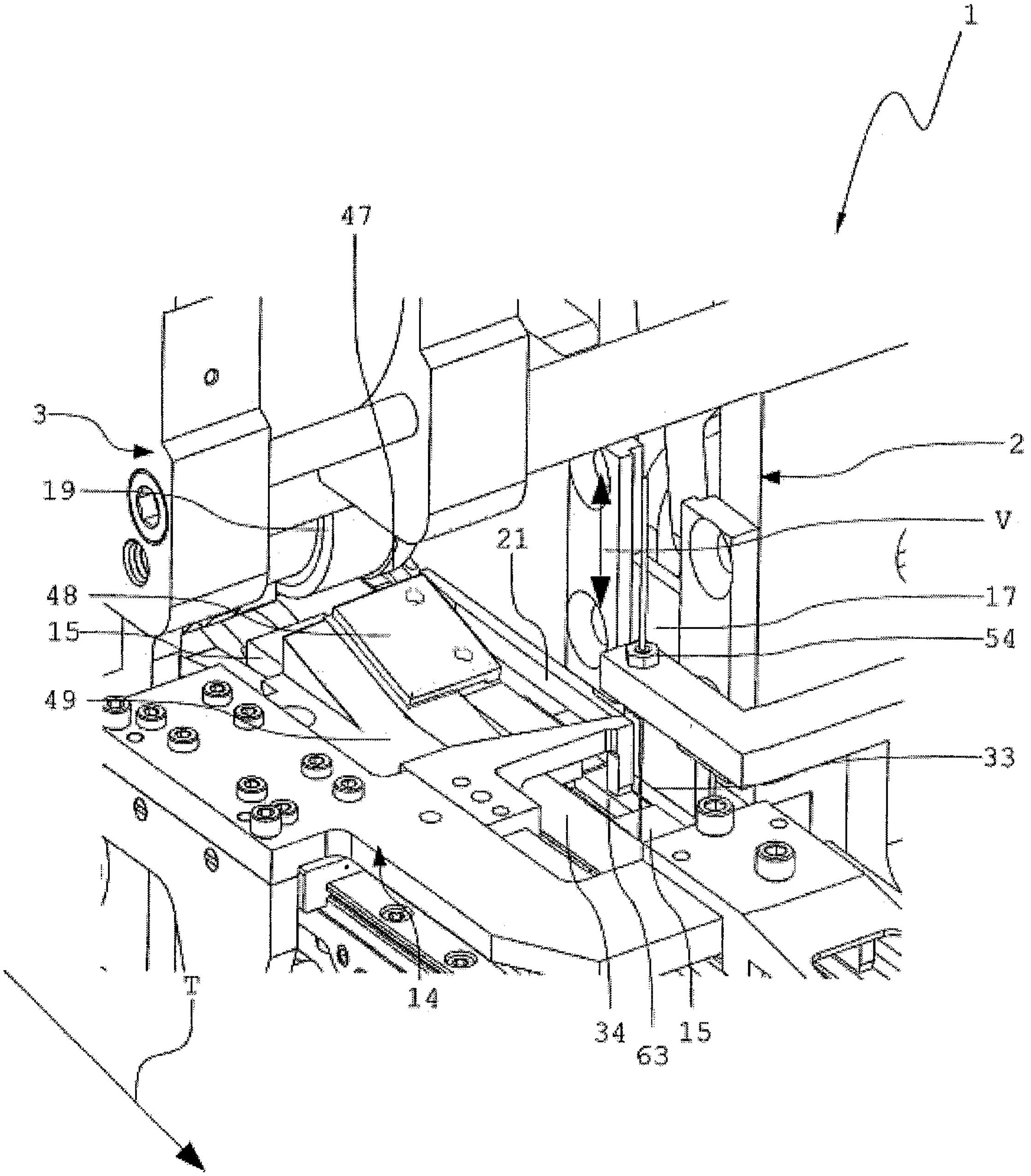
FIG. 4 shows a detailed perspective view of a separation unit of the device for connecting a cable.

FIG. 4 shows a further perspective view of the device 1 in which the separation unit 2 is seen in detail. After the strip 21 and the connector 15 are fed out of the feeding mechanism 3 with the first nip roller 18 and its opening 22, they are received by a down holder spring 34. The down holder spring 34 is an elongated piece of metal. An end of the down holder spring 34, which points towards the feeding mechanism 3, is bent upwards to receive the electrical connector 15 and fixed by a clamp base block 49. The down holder spring 34 is held down by a clamp 48. The electrical connectors 15 are fed under the down holder spring 34 which presses the electrical connectors 15 constantly against a counter surface 63, such that the electrical connectors 15 are less likely to be lost.

The separation unit 2 includes a cutting die 17 which is movable in a vertical direction V. The cutting die 17 includes a cutting edge 33. As the connector 15 and the strip 21 are advanced in the direction of transport T, they come closer to the separation unit 2. A through beam sensor 54 detects a connector 15 in the separation unit 2. Then, the cutting die 17 is moved downwards and the cutting edge 33 separates the connector 15 from the strip 21.

Further, FIG. 4 shows a detail of the feeding mechanism 3. The first nip roller 18 includes a surface 47 for gripping the strip 21. The strip 21 is held tightly in between the surface 47 and the second nip roller 19. Thereby, the strip 21 can be advanced by the rotation of the nip rollers 18 and 19.

Figure 5:
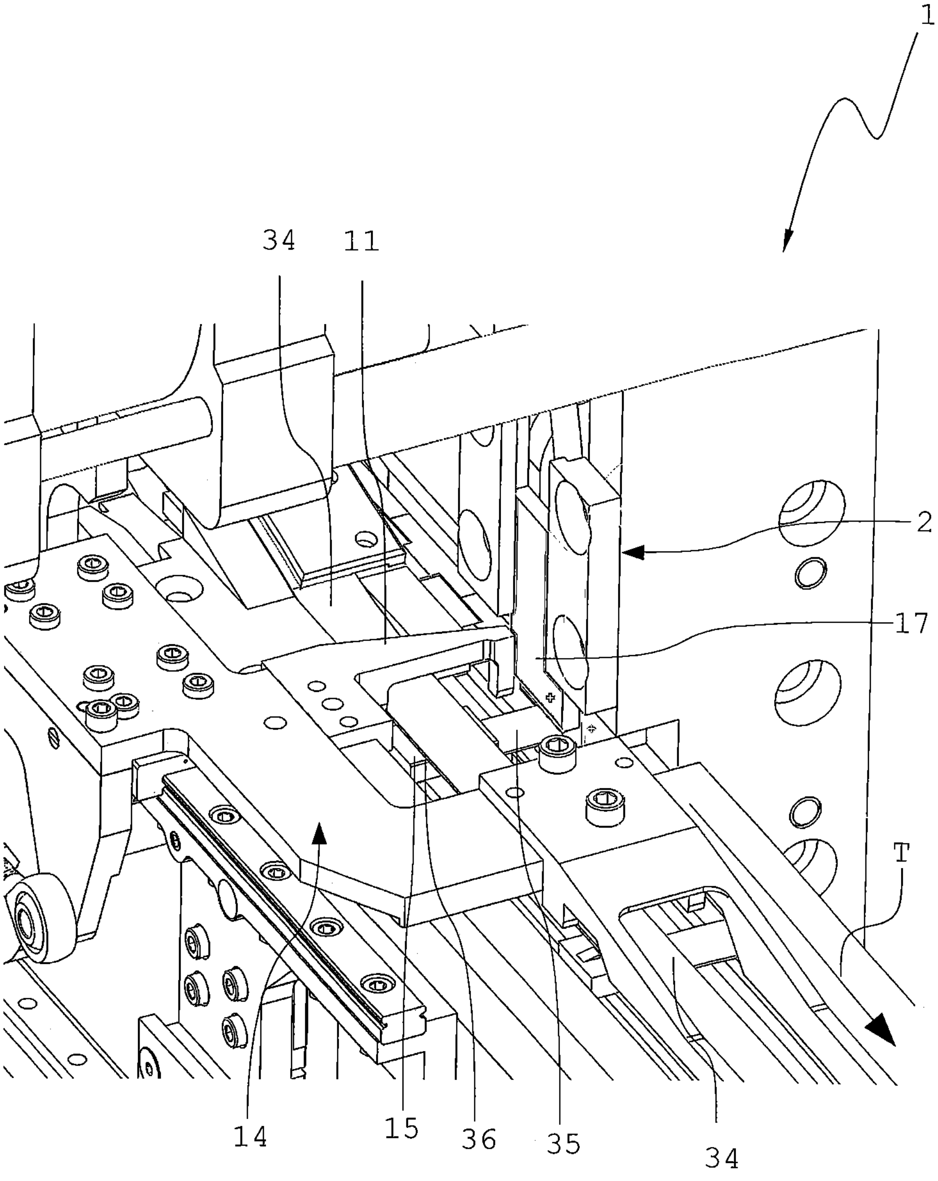
FIG. 5 shows a second detailed perspective view of the separation unit of the device for connecting a cable.

FIG. 5 is a second detailed perspective view of the separation unit 2. FIG. 5 shows a connector 15 with its plug 36 and its welding surface 35. The plug 36 is held down by the down holder spring 34. While the plug 36 is held down, the cutting die 17 separates the strip 21 from the connector 15. The singulated connector 15 is then further advanced by a bar 11 and a pusher 14 which is explained in further detail in connection with FIG. 6.

Figure 6:
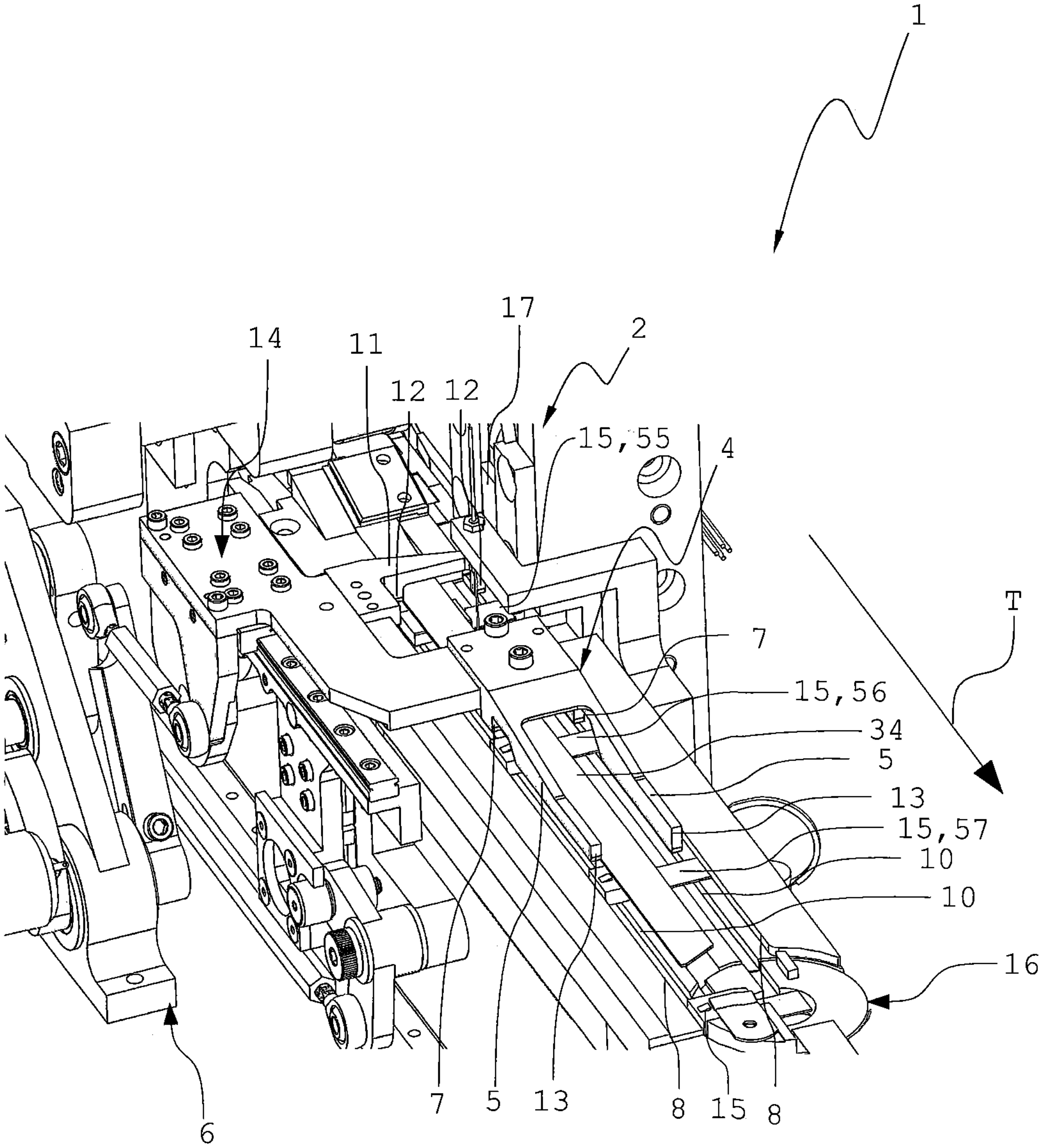
FIG. 6 shows a detailed perspective view of a transfer mechanism.

FIG. 6 shows a detailed perspective view of the transfer mechanism 4. The transfer mechanism 4 includes a pusher and bar 11. The pusher 14 and the bar 11 are fixedly attached to each other. In a starting position, the pusher 14 is positioned above, but not in contact with the connector 15, as shown in FIGS. 5 and 6. At this time, the connector 15 and the strip 21 may be inserted below the pusher 14 into the separation unit 2 by the feeding mechanism 3.

Once the through beam sensor 54 (see FIG. 4) detects the presence of a connector 15, the cutting die 17 is moved vertically down such that a connector 15 in a first position 55 is separated from strip 21. At the same time or slightly later or before, the pusher 14 and the bar 11 are lowered. The bar 11 comprises two pushing surfaces 12. The two pushing surfaces are connected by a bridge. The bridge pushes the down holder spring 34 down and thus fixates the connector 15 or the plug 36 of the connector 15 when it is separated from the strip 21. After the connection to the strip 21 is cut, the connector 15 may be advanced by the transfer mechanism 4.

The pusher 14 and the bar 11 are moved in the direction of transport T. The connector 15 is thereby pushed with the pushing surfaces 12 of bar 11 along the direction of transport T from the first position 55. After a first length, the connector 15 is in a second position 56. When the connector 15 is in the second position 56, the pusher 14 is lifted up and moved back against the direction of transport T. The pusher 14 is moved back to the starting position where it is positioned above another connector 15 which, in the meantime, has been fed by the feeding unit 3 into the separation unit 2.

The pusher 14 includes two feed fingers 5. The two feed fingers 5 are identical and fixedly attached to each other. Each of the feed fingers 5 includes a recess 7. At the end of each finger 5, a fingertip 13 is arranged. Each of the feed fingers 5 is guided by tracks 10. The tracks 10 are provided within a guiding surface 8 for the connectors 15. The guiding surface 8 forms a canal which guides connectors 15 along the direction of transport T. The canal includes a substantially flat bottom surface with two parallel opposing side walls. The side walls are orthogonal to the bottom surface.

When the pusher 14 is lowered again such that the bar 11 presses the down holder spring 34 down for separating a second connector 15 in the first position 55 from the strip 21, the recess 7 receives the connector 15 which is in the second position 56.

Then, the separated connector 15 in position 55 and the connector received by the recess in position 56 are pushed together in the direction of transport T for a length. After the push, one connector 15 is in the first position 55, one connector 15 is in the second position 56 and one connector is in a third position 57. Then, for a third time, the pusher 14 is lifted up and moved backwards against the direction of transport T. From its starting position, the pusher 14 pushes a connector 15 from the third position 57 another length in the direction of transport T. This time, the connector 15 is advanced by the finger tips 13 of the fingers 5. The finger tips 13 push the connector into the welding nest 16.

Figure 7:
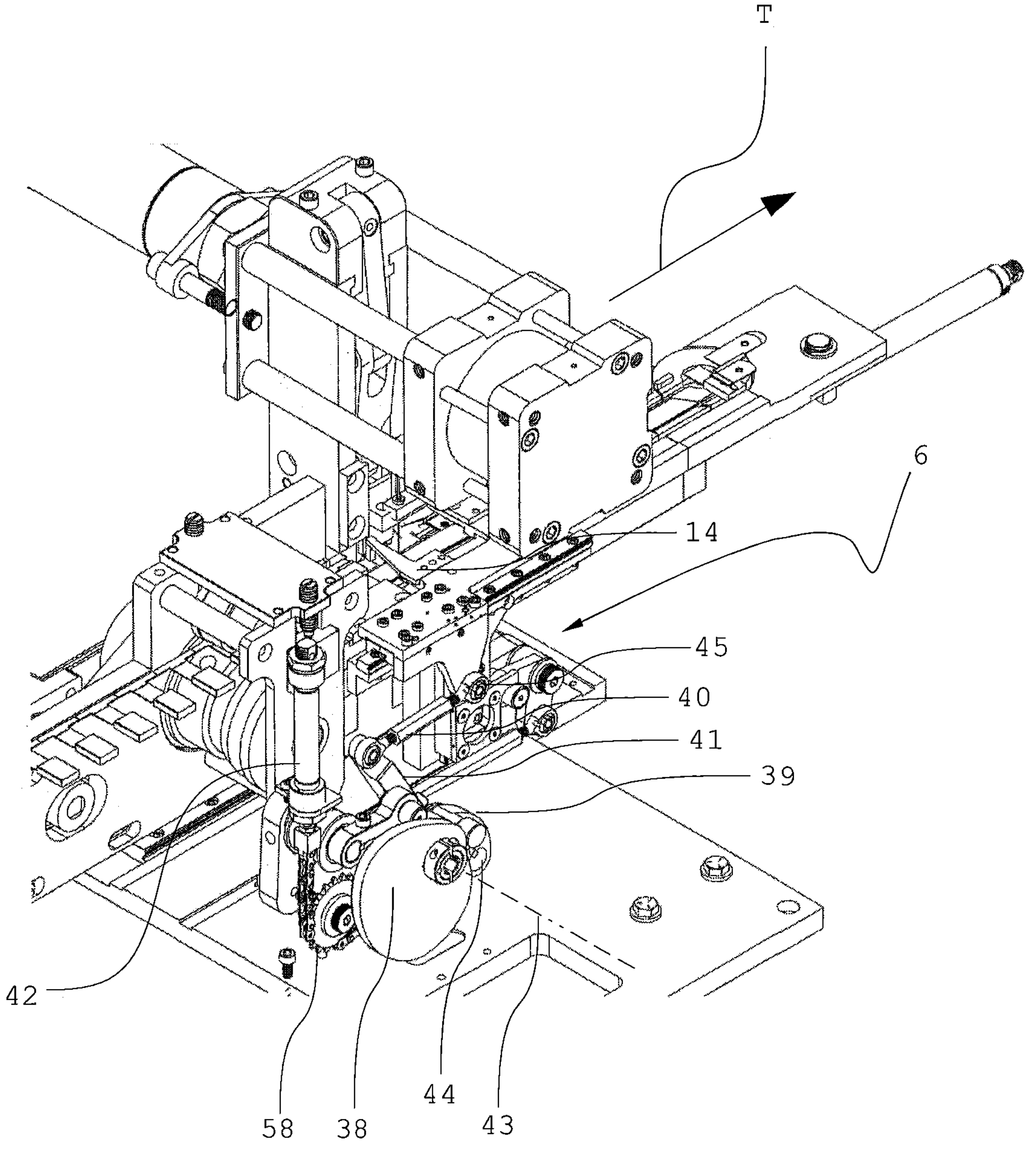
FIG. 7 shows a detailed perspective view of an actuation mechanism and FIG. 8 A-D show a detailed perspective view of a welding nest

FIG. 7 shows a detailed perspective view of means 6 for reciprocally advancing and retracting the pusher 14. The means 6 include a cam 38. The cam 38 rotates around an axis 43. A cam lever 39 is pushed against an oval outer surface of the cam 38. As the cam 38 rotates, the cam lever 39 is moved backwards and forwards and thus rotated around its bearing 44 by sliding on an outer surface of the cam 38. At the bearing 44, a chain 58 is tensioned such that the cam lever 39 is biased against an outer surface of the cam 38.

The bias is caused by a pneumatic cylinder 42 (see FIG. 2). The pneumatic cylinder 42 includes a spring which biases the chain 58 and thus the lever 39. The cam lever 39 is fixedly linked to an actuation lever 41. The actuation lever 41 is connected by a bearing to a tie rod 40. The tie rod 40 is connected to the pusher 14 via a hinge 45 on the other end. Since levers 39 and 41 are fixedly connected, a rotation of the cam lever 39 around its bearing 44 causes a rotation of actuation lever 41 around the bearing 44. When the levers 39, 41 are moved upwards, the pusher 14 is pushed forwards in the direction of transport T. After the oval shape of the cam has reached its peak, the cam surface allows the cam lever 39 to rotate backwards. At this position, the end of the actuation lever 41, which is connected via the tie rod 40 to the pusher 14, is positioned above the hinge 45. Thus, when the pusher 14 is pushed backwards, it is lifted upwards at the same time. Thereby, while pulling back the pusher 14 against the direction of transport T, the pusher 14 is lifted above connector 15.

FIGS. 8A to 8D show the welding nest 16 in detail. In practice, it may be necessary to connect an electric connector with a cable such that a longitudinal axis of the connector and the cable are parallel. In other instances, it may also be desirable to connect the electrical connector and the cable at an angle.

The electric welding nest 16 includes a welding ring 9 which is rotatable as to provide such an angle. The electrical connector 15 is pushed into the welding nest 15 by the finger tips 13. The welding ring 9 includes a receiving recess 60 in which the connector 15 is held. A spring 59 is mounted on top of the welding nest 16 to guide the connector 15 into the recess 60.

Figure 8A:
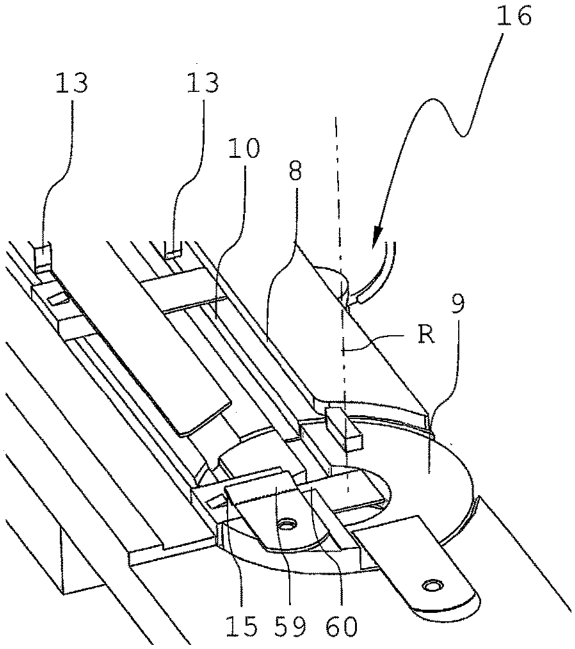
Figure 8B:
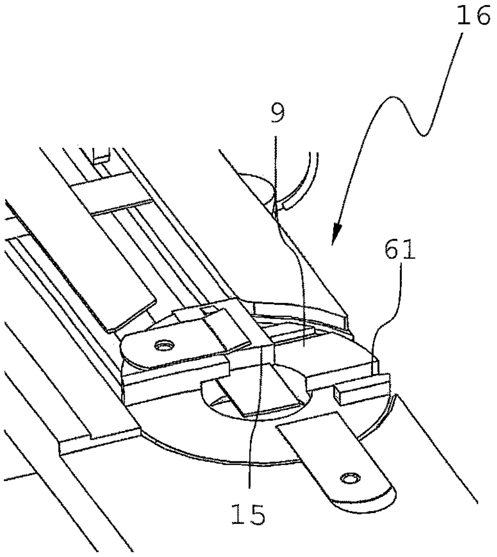
Figure 8C:
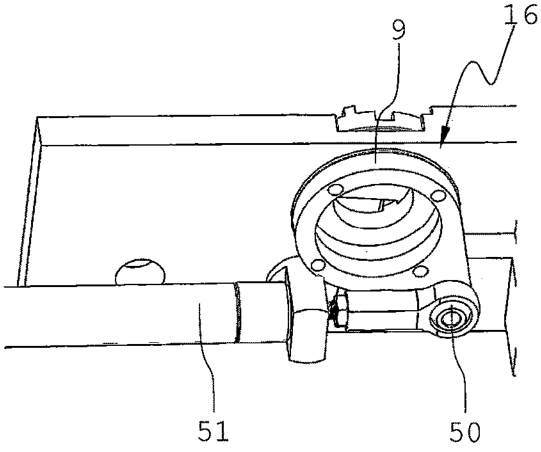
Figure 8D:
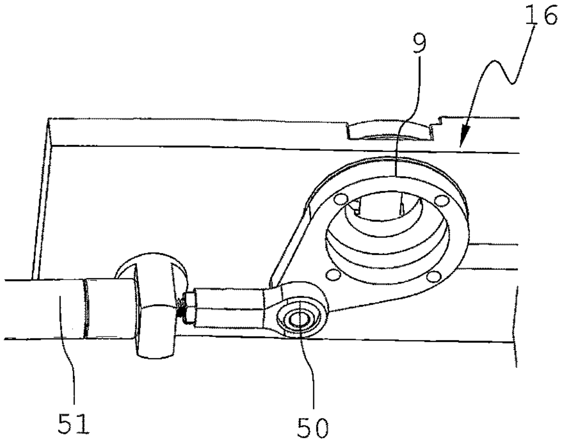

The rotation of the building nest 16 is seen in the transition from FIG. 8A to FIG. 8B and in the transition from FIG. 8C to FIG. 8D. FIGS. 8C and 8D show the welding nest 16 from the bottom. The welding nest 16 includes a cylinder 51 which is connected to a welding ring 9 via a pivot bearing 50. When the cylinder is moved back and forward as seen in FIGS. 8C and 8D, the welding ring 9 is rotated around the pivot axis R. As welding ring 9 is rotated, the connector 15 received by the recess 60 of the welding ring 9 is also rotated. Thereby, once a connector 15 is received in the welding nest 16 and thus in welding ring 9, it may be oriented relative to the cable by moving the cylinder 51.

Then a cable with a stripped end is inserted into the welding nest 16. The welding nest 16 comprises a channel 61. The cable is inserted into the channel and the stripped end is brought in contact with the welding surface 35. In the next step, an ultrasonic horn presses the stripped end against the welding surface 35 and an anvil and welds the stripped end and the connector 15 together (not shown).

An alternative feeding mechanism may comprise ratchet fingers, which advance the connectors to the separation unit. The ratchet fingers may include a rectangular cut out, which is shaped to receive a connector at the side of the connector. Then, the ratchet fingers are pushed towards the separation unit. The ratchet finger can be retracted, for example, once they reach the separation unit.

The ratchet fingers are mounted pivotably to a ratchet bar. When the ratchet bar is retracted, the ratchet fingers rotate counterclockwise and slide along the top side of the connectors. The pivotable connection also includes optionally a spring which presses the ratchet finger clockwise downwards. Thus, as soon as the ratchet fingers reach a gap between two connectors they snap into the gap and, when the ratchet bar is advanced again, they push the connector forward. Since the connectors are connected to the strip, all connectors 15 which are connected to the strip are pushed, if only one of the connectors is pushed.

The ratchet fingers are reciprocally moved backwards and forwards by the ratchet bar, which is actuated by an air cylinder.

Figure 9:
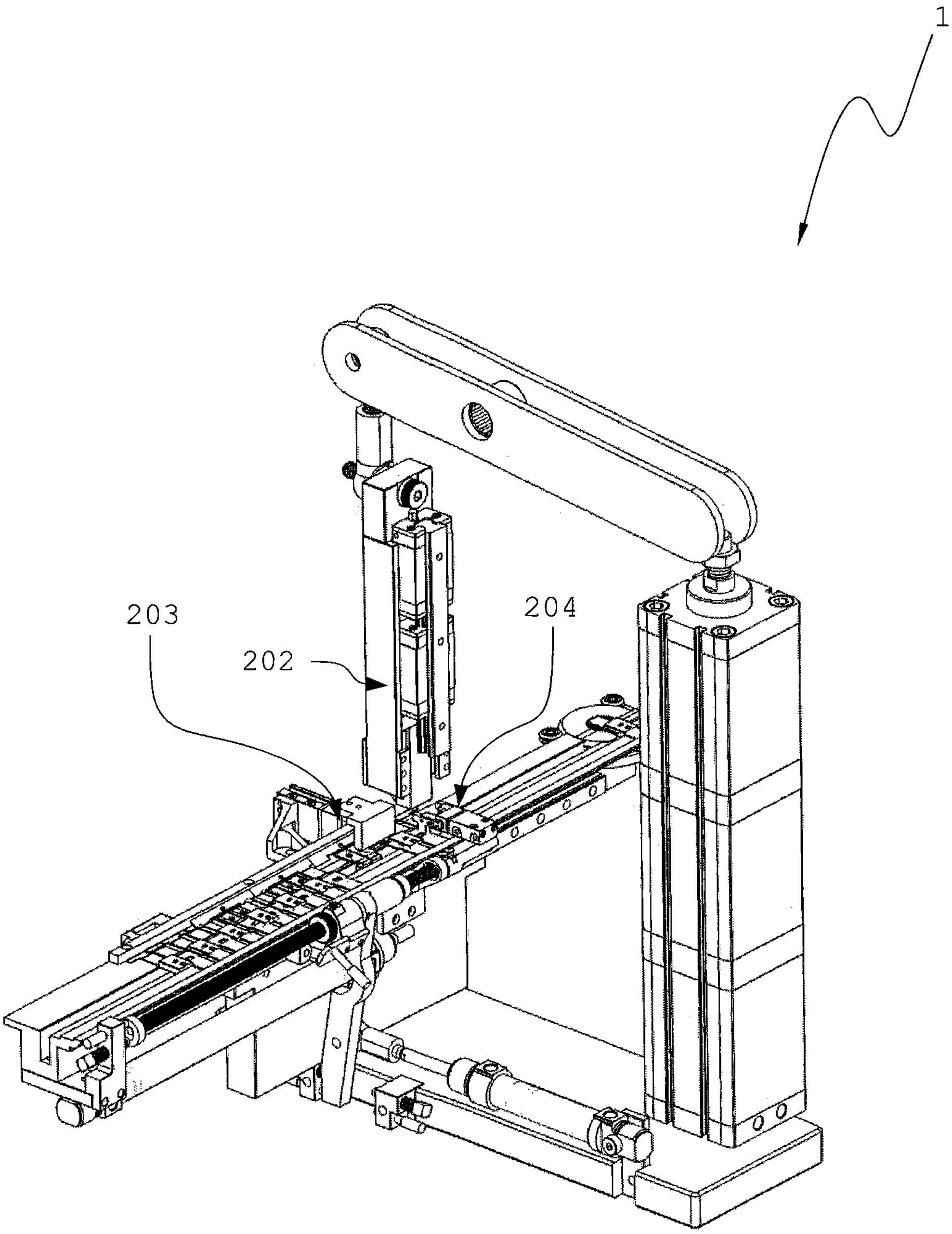
FIG. 9 shows a first perspective view of a second embodiment according to the invention
Figure 10:
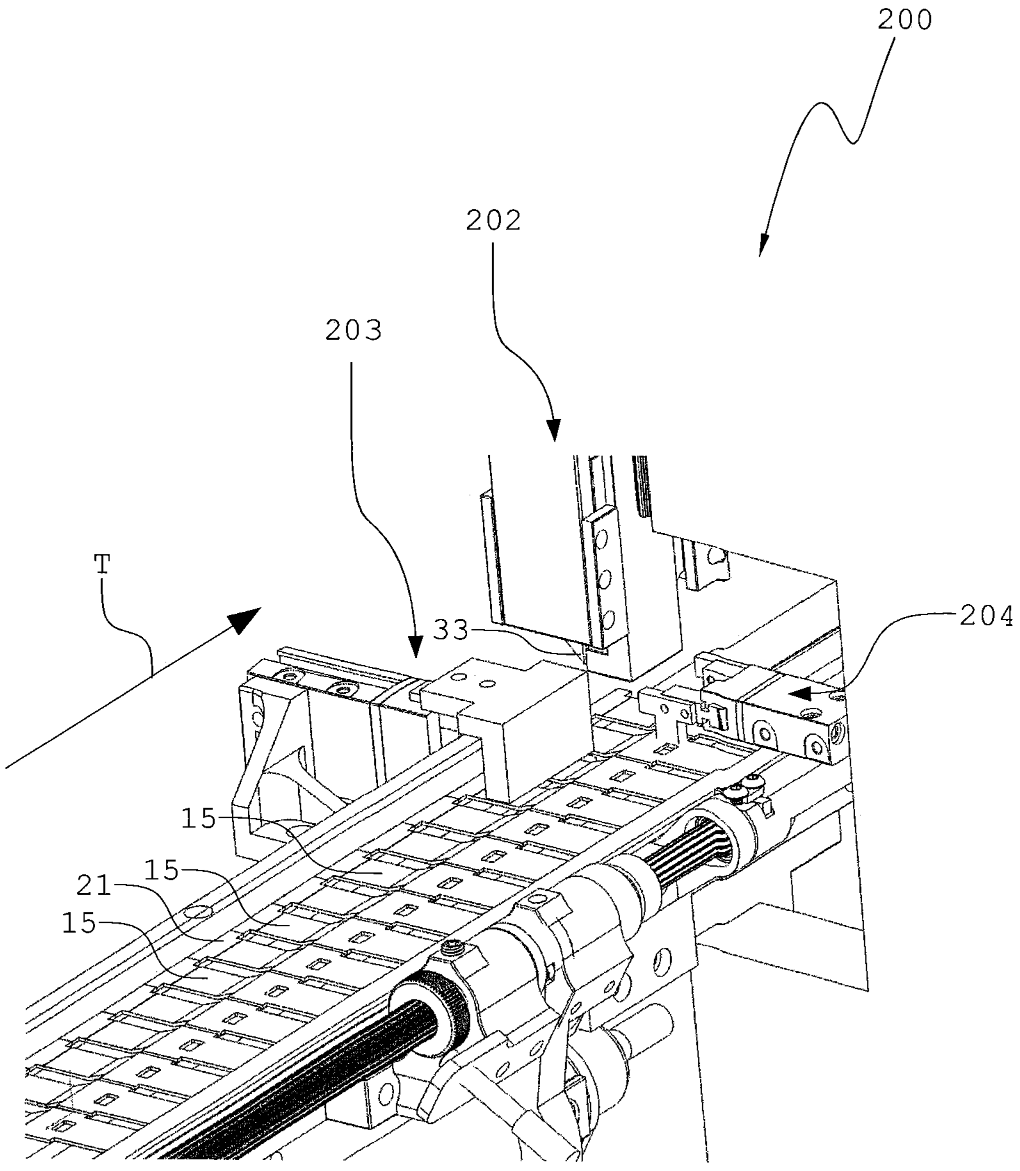
FIG. 10 shows a second perspective view of a second embodiment according to the invention

FIGS. 9 and 10 show a device 200 according to another embodiment of the invention. The device 200 includes a feeding mechanism 203, a separation unit 202 and a transfer mechanism 204. The separation unit 202 is similar to the separation unit 2 shown previously. The feeding mechanism 203 will be explained in more detail with regard to FIGS. 11 and 12.

Figure 11:
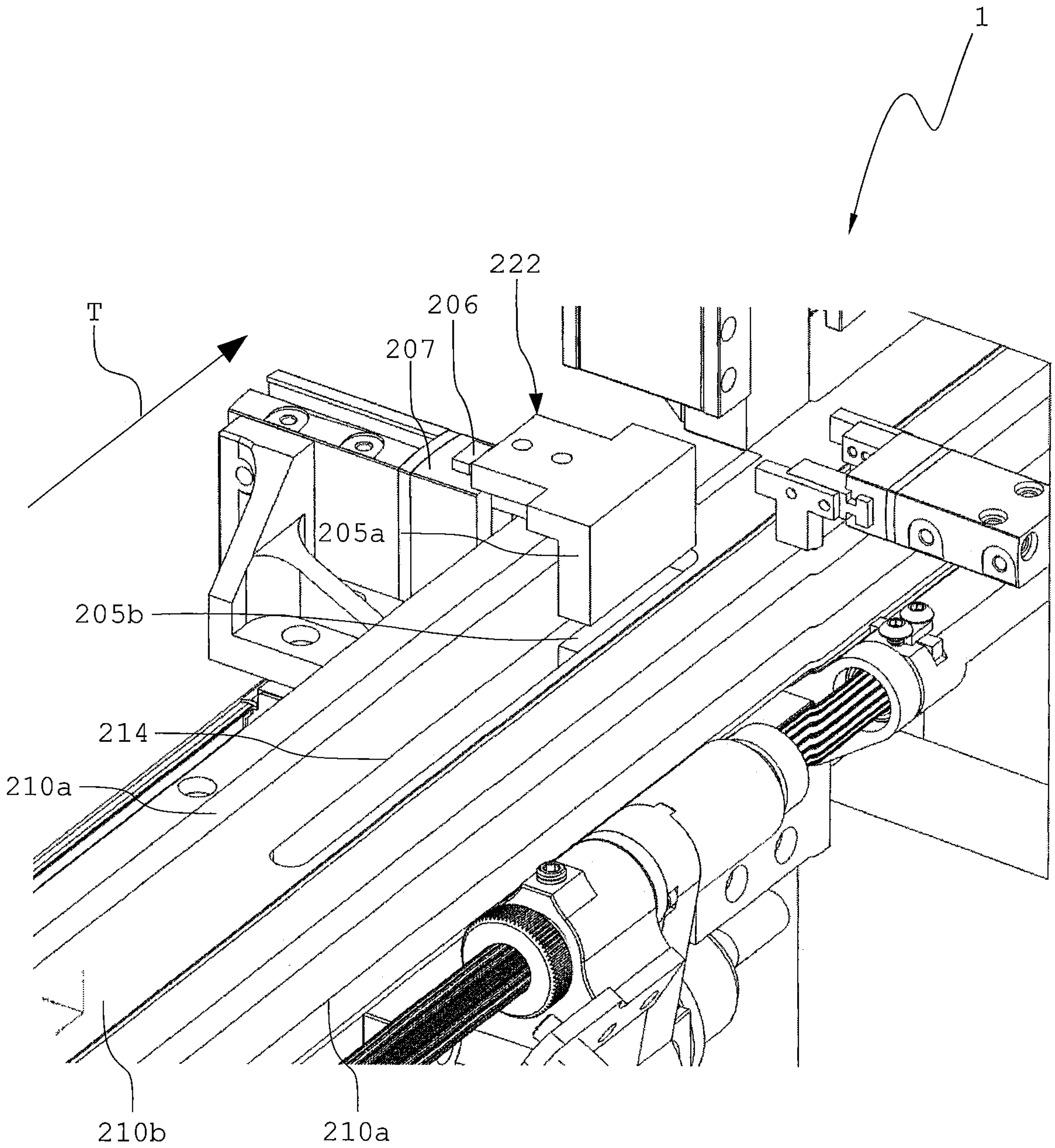
FIG. 11 shows a detailed perspective view of a feeding mechanism of FIG. 10
Figure 12:
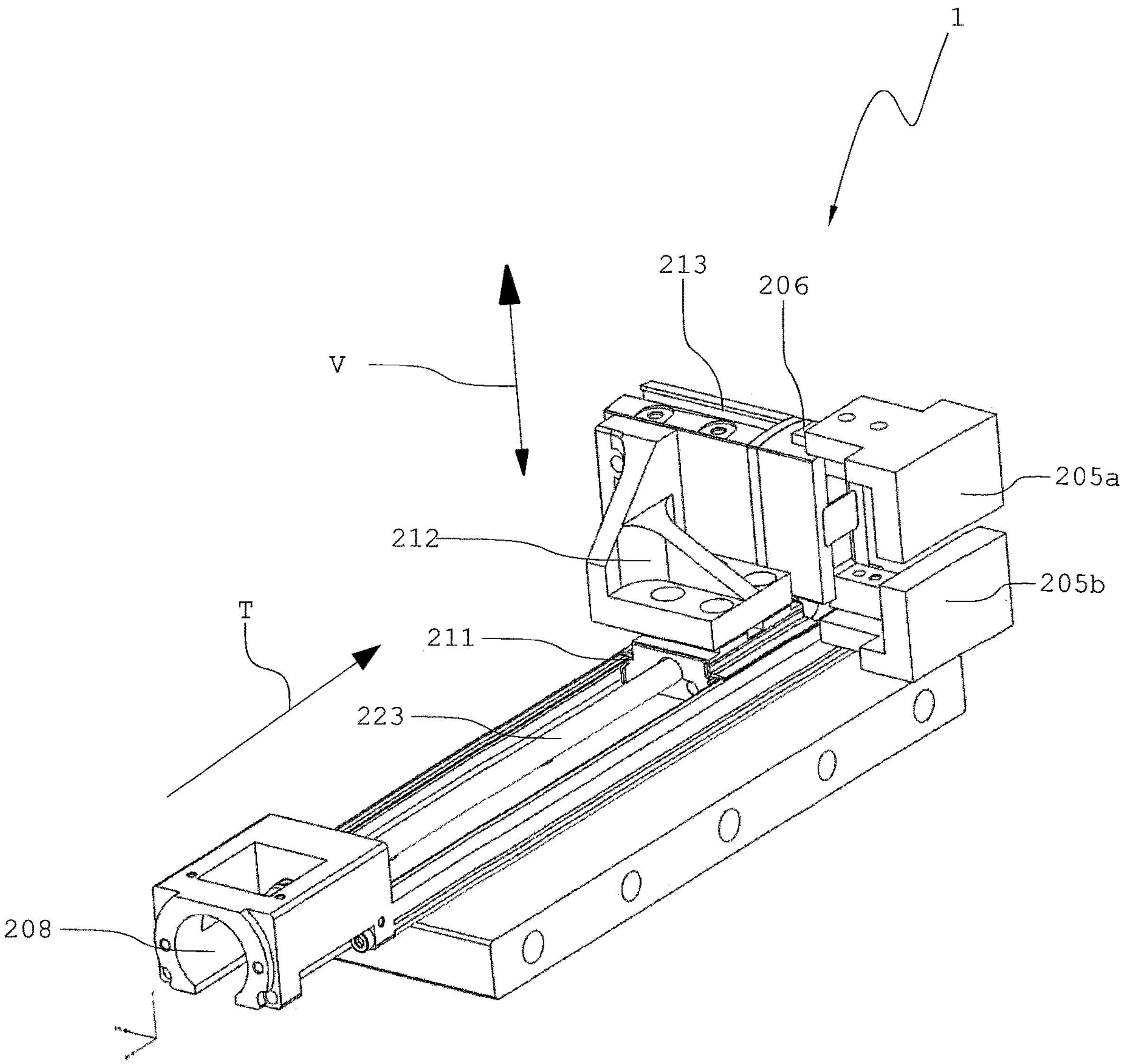
FIG. 12 shows a second detailed perspective view of the feeding mechanism of FIG. 10

As can be seen from FIG. 10 and from FIGS. 11 and 12 in detail, the feeding mechanism 203 includes a feeding clamp 222 with a first jaw 205*a* and a second jaw 205*b*. The jaws 205*a* and 205*b* can be moved towards each other by a pneumatic actuator, such that a connector 15 (see FIG. 10) is clamped in between the jaws 205*a* and 205*b*.

Once a connector 15 is clamped, the jaws 205*a* and 205*b* are maintained in the clamped position and can be moved along the direction of transport T. Since all connectors 15 are connected via the strip 21, the gripping of a single connector 15 leads to a feeding of all connectors connected to the strip 21.

As can be seen from FIG. 10, the jaw 205*a* can clamp two connectors 15 at the same time. Thereby, a higher force may be transmitted from the jaws to the connectors.

As can be from FIG. 11, the feeding mechanism 23 comprises transfer guiding surfaces 210, in which the connectors 15 are transported. The transfer guiding surfaces 210 form a U-shape and include two side surfaces 210*a* which guide the connector and a base 210*b* on which the connector rests. The base surface 210*b* includes an elongated hole 214. The lower jaw 205*b* is moved through the elongated hole 214 to clamp one or more connectors 15. The elongated hole 214 defines a range of movement for the jaws 205*a, b*.

The jaws 205*a* and 205*b* each comprise a cam 206, which slides in the vertical direction along a notch of a holder 207. The holder 207 additionally comprises an actuator 213 for actuating the vertical movement of both jaws 205*a, b*. The actuator 213 may pneumatic.

The driver 213 and jaws 205*a, b* are mounted on a carriage 211 via an angle bracket 212. The carriage 211 is actuated by a motor or a cylinder (not shown, preferably a stepper motor) held by enclosure 208. Further, the carriage 211 is guided by a slide rail 223.

Figure 13:
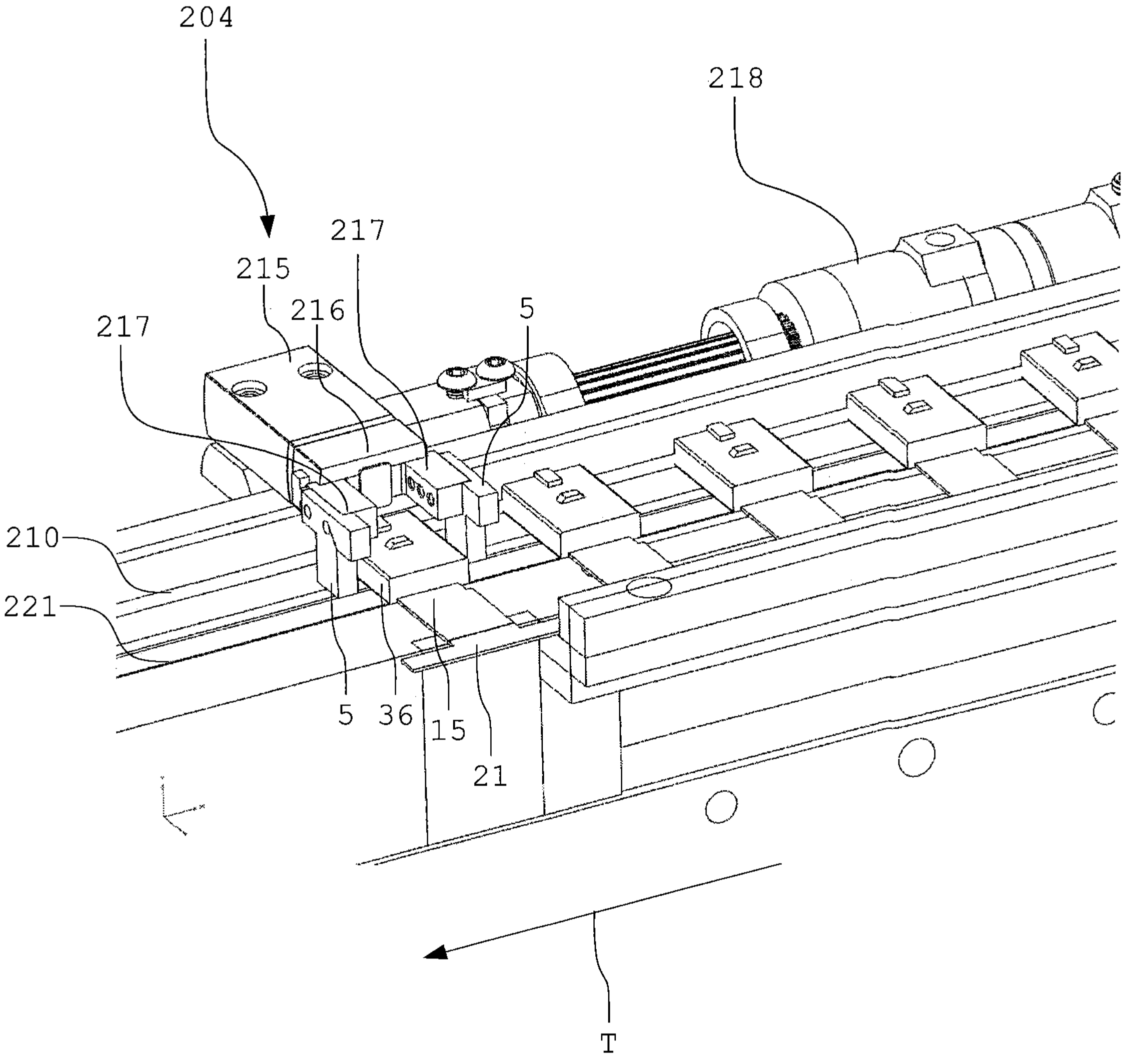
FIG. 13 shows a detailed perspective view of the transfer mechanism of FIG. 10.

FIG. 13 shows the transfer mechanism 204. The transfer mechanism 204 is shown in isolation in FIG. 13. In particular, the separation unit 202 and the feeding mechanism 203 are not displayed. The perspective view of FIG. 13 is from another side compared to FIGS. 10 to 12 such that, in the plane of the drawing the direction of transport T is in an opposing direction.

The transfer mechanism 204 includes a pusher 215 with a gripper 216. The gripper 216 includes two gripper jaws 217. The fingers 5 are attached to the gripper jaws 217. A connector 15, i.e. the plug 36 of the connector 15 is clamped by opposing side surfaces of the fingers 5. The position shown in FIG. 13 of the transfer mechanism 204 is the same position such as shown in FIG. 10. The pusher 215 is positioned directly after the separation unit 202 directly before the time when the connector 15 is separated from the strip 21.

The fingers 5 hold the connector 15 securely at the plug 36. Optionally the connector may already be held during cutting. Thus, after the cutting, the connector 15 is not lost and can be transported to the welding nest 16. For transporting the clamped connector 15, the transfer mechanism 204 includes a drive 218. The drive 218 includes a cylinder which moves the pusher 215 along the direction of transport T.

During the transport the connectors 15 are additionally guided by the guiding surfaces 210. The guiding surface 210 orients the electrical connectors 15. The transfer mechanism 204 additionally includes a track 221, into which tips of the feed fingers 5 are inserted. During transport of the connectors 15 the feed fingers slide along the track 221. As a result, the connectors 15 can be precisely guided and positioned with relatively simple motors.

Figure 1:
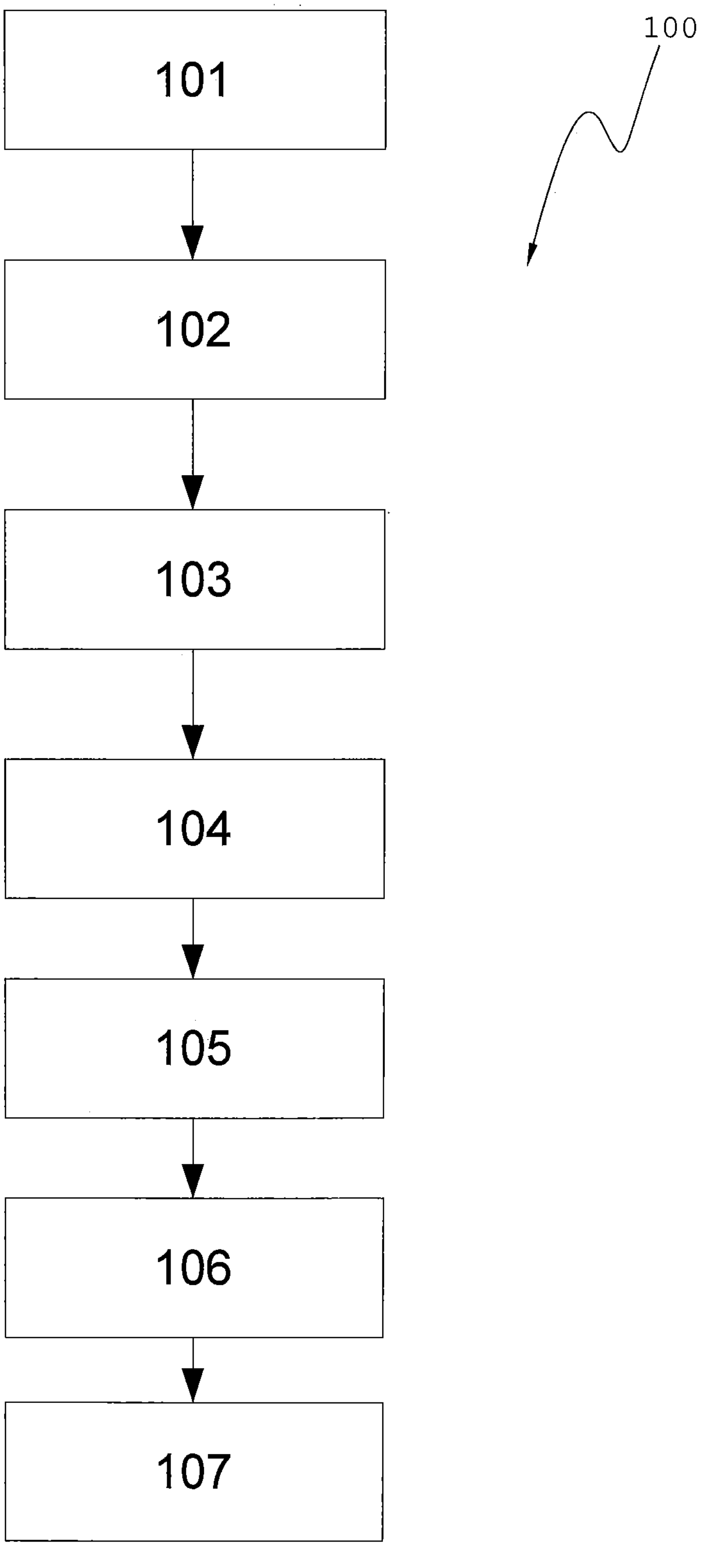
FIG. 1 shows a process flow of a method for connecting a cable.

The connector 15 is released in the welding nest 16 by moving the fingers 5 apart such that the connector plug 36 is no longer clamped. FIG. 1 shows a process flow with a sequence of steps for a method 100 for connecting the electrical connector 15 to a cable. The sequence of steps is shown in the following and the general principle (mutatis mutandis) can be utilized in combination with all above embodiments.

In a first step 101, a stepper motor moves the feeding clamp 222 (first gripper) in a linear movement against the direction of transport T along the elongated hole 214 and along the guiding surfaces 210*a, b*. Then, the feeding clamp 222 grips a connector 15 and/or the strip 21 with the pneumatic actuator 213. After gripping, the feeding clamp moves the connector 15 (optionally via the strip 21) in the direction of transport T. Position sensors detect the current position of the carriage 211 and thus of the feeding clamp 222.

The feeding clamp 222 moves the connector 15 (and/or the strip 21) until—in a second step 102—a sensor detects the presence of the connector 15 in the separation unit 202. As soon as the connector is detected, the feeding clamp 222 stops moving.

Then, in a third step 103, the gripper 216, which is also actuated pneumatically, grips the connector 15 and afterwards the feeding clamp 222 releases the connector 15. In a fourth step 104, the connector is removed from the strip with the pneumatic separation unit 202. In a fifth step 105, the gripper 216 transports the single separated connector 15 to the anvil of the ultrasonic welding nest 16 while being held by the gripper 216.

Thereafter, the single connector 15 is inserted into the welding nest in a sixth step 106. In a seventh step 107, the gripper 216 and the feeding clamp 222 return to their starting positions. Optionally, the welding nest may rotate as described above. The welding nest includes position sensors that detect the current orientation of the welding nest. Additional sensors may detect a presence of a connector in the welding nest.

The invention claimed is:

1. A device for connecting a cable to an electrical connector, the device comprising a welding nest and a connector advancing mechanism for feeding the electrical connector to the welding nest, wherein the connector advancing mechanism comprises:

a separation unit for separating at least one connector from a strip to which the connector is attached, a feeding mechanism for feeding the connector to the separation unit, a transfer mechanism for transferring the connector from the separation unit to the welding nest, wherein, along a direction of transport of the connector, the feeding mechanism is disposed before the separation unit and the separation unit is disposed before the transfer mechanism, and wherein the transfer mechanism includes at least one transfer guiding surface and a pusher with one or two or more feed fingers for pushing a singularized connector in the direction of transport along the at least one transfer guiding surface wherein the transfer guiding surface comprises side walls which are adapted to guide the connectors.

2. The device according to claim 1, wherein the transfer mechanism comprises a connector gripper and two or more feed fingers which are fixedly attached to jaws of the gripper.

3. The device according to claim 2, wherein the connector gripper is adapted to hold a connector in the separation unit.

4. The device according to claim 1, wherein the transfer mechanism comprises at least one track for guiding one or more of the feed fingers.

5. The device according to claim 1, wherein the feeding mechanism includes a feeding clamp for gripping the connector and/or the strip, and the feeding mechanism further includes an actuator for moving the clamp along the direction of transport.

6. The device according to claim 5, wherein the feeding mechanism comprises feeding guiding surfaces for guiding the connectors along the direction of transport.

7. The device according to claim 5, wherein the feeding guiding surfaces form an elongated hole for the feeding.

8. The device according to claim 7, wherein a jaw of the feeding clamp is movable through and along the elongated hole.

9. The device according to claim 1, wherein the separation unit includes a position sensor for detecting a presence of a connector.

10. The device according to claim 9, wherein the position sensor is a photoelectric sensor.

11. The device according to claim 9, wherein the position sensor is a through beam sensor.

12. The device according to claim 1, wherein the welding nest includes a rotation mechanism for rotating the nest around a pivot axis for orienting the connector in relation to the cable.

13. The device according to claim 1, wherein the separation unit comprises a cutting die.

14. The device according to claim 1, wherein the welding nest is an ultrasonic welding nest.

15. The device according to claim 1, wherein the transfer guiding surface forms a canal which includes a substantially flat bottom surface.

16. The device according to claim 15, wherein the transfer guiding surface is U-shaped or L-shaped.

17. The device according to claim 15, wherein the canal includes side walls which are arranged orthogonally to the substantially flat bottom surface.

18. The device according to claim 1, wherein the side walls are parallel to each other.

19. A method for connecting a cable to an electrical connector, the method comprising the steps of:

(a) feeding at least one connector which is attached to a strip into a separation unit with a feeding mechanism, (b) separating the connector from the strip with the separation unit, (c) transferring the connector from the separation unit to a welding nest with a pusher including one or more feed fingers by pushing the connector in the direction of transport along at least one transfer guiding surface, (d) inserting a cable into the welding nest and bringing it into contact with the connector and rotating the welding nest with the connector in relation to the cable, (e) welding the separated connector to the cable in the welding nest.

20. The method according to claim 19, wherein the step (b) further includes:

before separating the connector from the strip, clamping the connector with a connector gripper including the one or more feed fingers, wherein the connector is clamped by the connector gripper in the separation unit.

21. The method according to claim 19, wherein the separation unit is a cutting die.

22. The method according to claim 19, wherein in the step (e), the separated connector is welded to the cable in the welding nest by ultrasonic welding.

23. A method for connecting a cable to an electrical connector, with a device according to claim 1, the method comprising the steps of:

(a) feeding at least one connector which is attached to a strip into the separation unit with the feeding mechanism, (b) separating the connector from the strip with the separation unit, (c) transferring the connector from the separation unit to the welding nest with the pusher by pushing the connector in the direction of transport along the at least one transfer guiding surface, (d) inserting a cable into the welding nest and bringing it into contact with the connector, (e) welding the separated connector to the cable in the welding nest.

* * * * *